United States Patent [19]
Hall et al.

[11] Patent Number: 5,089,558
[45] Date of Patent: Feb. 18, 1992

[54] THERMOFORMABLE BLENDS OF MULTIBLOCK POLYMER COMPOSITIONS WITH POLYSTYRENE

[75] Inventors: James E. Hall, Mogadore; Daniel F. Graves, Clinton, both of Ohio

[73] Assignee: Bridgestone/Firestone, Inc., Akron, Ohio

[21] Appl. No.: 646,485

[22] Filed: Jan. 28, 1991

Related U.S. Application Data

[63] Continuation of Ser. No. 343,922, Apr. 26, 1989, abandoned.

[51] Int. Cl.$^5$ .................. C08L 25/06; C08L 53/02
[52] U.S. Cl. ............................. 525/89; 525/99
[58] Field of Search ............................ 525/89

[56] References Cited

U.S. PATENT DOCUMENTS 4,847,326  7/1989  Vituske .................................. 525/89

FOREIGN PATENT DOCUMENTS

| | | | |
|---|---|---|---|
| 135167 | 3/1985 | European Pat. Off. | 525/89 |
| 000250 | 1/1978 | Japan | 525/89 |
| 070043 | 6/1981 | Japan | 525/89 |
| 021442 | 2/1982 | Japan | 525/89 |
| 021449 | 2/1982 | Japan | 525/89 |
| 098544 | 6/1982 | Japan | 525/89 |

Primary Examiner—John C. Bleutge
Assistant Examiner—David Buttner
Attorney, Agent, or Firm—Frank J. Troy, Sr.

[57] ABSTRACT

A polymer composition for use in making thermoformed products which comprises a blend of: (1) 20 to 75% by weight of a polyvinylaromatic resin, (2) 20 to 75% by weight of $S_1$-$(B/S_2)_n$ type block copolymer wherein $S_1$ and $S_2$ are vinylaromatic block polymers, B is a diene block polymer, $(B/S_2)$ represents a tapered or non-tapered block copolymer and the $S_1$ block is 5 to 20% by weight of the block copolymer, $(S_1+S_2)$ is 65 to 95% by weight of the block copolymer, and the total block styrene content of the block copolymer ranges between 35 and 80% by weight, and (3) 0.5 to 10% by weight a diene-vinylaromatic block copolymer ($B'$-$S'$) containing 10-60% by weight of the vinylaromatic polymer block.

15 Claims, No Drawings

THERMOFORMABLE BLENDS OF MULTIBLOCK POLYMER COMPOSITIONS WITH POLYSTYRENE

This application is a continuation of application Ser. No. 343,922, filed Apr. 26, 1989, now abandoned.

FIELD OF THE INVENTION

This invention relates to a blend of a polyvinyl aromatic resin, especially polystyrene, with a mixture of multiblock polymer compositions to produce a resin blend which possesses high clarity and high impact strength or flexibility for use in making thermoformed products such as clear cups and other plastic containers.

BACKGROUND OF THE INVENTION

In the past polystyrene has been blended with high styrene content 1,3-butadiene/styrene multiblock copolymers for thermoforming. Generally (S-B)x star block copolymers having a 75-80% styrene content were utilized. When linear block copolymers such as S-B-S or B-S-B-S type have been used, however, these resins were not suitable for thermoforming as when they were blended with polystyrene the thermoformed blends lacked high clarity and/or high impact strength or flexibility.

DETAILED DESCRIPTION OF THE INVENTION

The resin compositions according to the instant invention comprise a blend of (1) 20 to 75% by weight of a polyvinyl aromatic resin, (2) 20 to 75% by weight of $S_1$-$(B/S_2)_n$ copolymer wherein $S_1$ and $S_2$ are vinylaromatic resin blocks, B is a diene block, $(B/S_2)$ is a tapered or non tapered block copolymer $n \geq 1$, the terminal $S_1$ block constitutes 5 to 20% by weight of the total block copolymer, the total amount of $(S_1+S_2)$ is between 65 and 95% by weight of the total block copolymer, and the block vinylaromatic content of the total block copolymer (consisting of all segments greater than 4 monomer units) ranges between 35 and 80% by weight, and (3) 0.5 to 10% by weight of a diene/vinyl aromatic block copolymer containing 10 to 60% by weight of vinylaromatic monomer units and a molecular weight of the copolymer between 20,000 and 250,000, preferably 50,000 to 150,000.

The resin blend of the instant invention is comprised of three components (1) a polyvinyl aromatic resin, (2) a $S_1$-$(B/S_2)_n$ tapered or non-tapered block copolymer and (3) a diene/vinylaromatic multiblock copolymer. For each of these components of the resin blend the vinylaromatic monomer used to form the polymer or block copolymers utilized in the instant invention is preferably styrene but includes alpha-methylstyrene, methyl substituted styrene, methyl substituted alpha-methylstyrene or combinations thereof. The polydiene block which are utilized in resin blend components (2) $S_1$-$(B/S_2)_n$ and (3) polydiene-polyvinyl aromatic block copolymer are preferably formed from 1,3-butadiene but may be made from isoprene or 1,3-pentadiene or combinations thereof.

The polyvinyl aromatic resin (1) to be used in the instant invention has a melt index ranging from 3 to 15, preferably having a melt index ranging between 4 and 10. This resin constitutes 20 to 75% by weight of the blend, preferably 35 to 65% by weight of the blend. Generally, polystyrene is utilized as this resin to lower the cost of the thermoformed products and to improve the clarity and flow properties of the final blended resin composition.

The second component of the resin blend is a $S_1$-$(B/S_2)_n$ block polymer which is used in the resin blend of the instant invention in an amount ranging from 20 to 75% by weight of the blend, preferably 30 to 60% by weight of the blend. $S_1$ represents an initially formed vinylaromatic block providing to 20% by weight of the block copolymer. $(B/S_2)$ represents a tapered or non-tapered block copolymer consisting of diene and vinylaromatic monomer units preferably 1,3-butadiene and styrene. The total vinylaromatic content $(S_1+S_2)$ of the $S_1$-$(B/S_2)_n$ block polymer ranges between 65 and 95% by weight of the total block polymer. After the $(B/S_2)$ tapered block copolymer has been made additional charges of 1,3-butadiene and styrene monomer can be added. Thus "n" represents the number of $(B/S_2)$ tapered block copolymer segments and preferably $n = 1$ to 3. When $(B/S_2)$ represents a non-tapered block copolymer the individual diene and vinylaromatic blocks are simply formed by sequential addition and block formation from the respective monomers to form the desired block structure which is not random. Thus the term non-tapered block copolymer means a non-random block copolymer formed from controlled sequential monomer addition wherein each monomer is polymerized to completion before addition of the next monomer charge.

The preferred block polymer composition of the instant invention contains a weight percentage content of $S_1$ of (7-15%), $(S_1+S_2)$ of (70-85%) and block styrene of (45-65%) as determined by $^1H_{nmr}$ (in which all segments of greater than 4 aromatic monomer units are measured as block styrene). The remaining styrene is present in non-block form. This second component has a melt index of 1 to 24, preferably 3 to 15.

The third component of the resin blend of the instant invention is a diene/vinylaromatic multi-block copolymer, B'-S', which contains 10 to 60% by weight of vinyl aromatic monomer contributed units or blocks, preferably 20 to 50% by weight. The remaining 90% to 40% by weight of the block copolymer is contributed by monomer diene units or blocks. This component comprises 0.5% to 10%, preferably 1% to 5% by weight of the resin blend. In the formula B'-S', B' represents suitable diene blocks and S' represents suitable vinylaromatic blocks. Suitable block copolymers for use in the instant invention may be characterized as having the following diblock, triblock, tetrablock, etc. or tapered macrostructures: B'-S', B'-S'-B', $(B'-S')_n$X, S'-B'-S', $(S'-B')_n$X, B'-S'-B'-S' or mixtures thereof where X represents a coupling agent residue and n' ranges from 2 to 6. Suitable coupling agents are well known in the art and can be di-, tri-, or tetrafunctional. Exemplary coupling agents include but are not limited to alkane dichlorides of 1–10 carbon atoms, $CCl_4$, $SiCCl_4$, and $(PNCl_2)_3$ and the like. As a practical limit the number of blocks B'+S' linearly placed along a polymer chain should not exceed seven (7). The molecular weight $(M_n)$ of this block copolymer component ranges between 20,000 and 250,000, preferably 50,000 to 150,000. The B'-S' components are utilized as dispersants in the preparation of the $S_1$-$(B/S_2)_n$ block copolymers or are solution blended with the $S_1$-$(B/S_2)_n$ block copolymers upon their recovery.

The block copolymers of components (2) and (3) are further identified and may be prepared in accordance with the application by the instant inventors entitled "Process For The Production of High Styrene Content Block Copolymers" filed on even date with the filing of the instant application.

The blend of the instant invention has a melt index ranging from 1 to 30 and provides for a resin which combines glass-like clarity with excellent impact strength and sheet flexibility, thus making it excellent for us in thermoforming processes to produce clear products such as plastic cups, containers, and the like.

According to the preferred embodiment of the instant invention, the resin blend of the instant invention has a melt index ranging from 5 to 15 and comprises (1) 35 to 65% by weight of polystyrene, (2) 30 to 60% by weight of a $S_1$-$(B/S_2)_n$ block copolymer having $S_1$ as an initial polystyrene block and $(B/S_2)$ as an attached tapered block copolymer formed from polybutadiene and polystyrene, wherein $S_1$ is 7 to 15% by weight, $(S_1+S_2)$ is 70 to 85% by weight, the block styrene content is 45 to 65% by weight of the block copolymer and the block copolymer has a melt index of 3 to 15, and (3) 1.0 to 5.0% by weight of a polybutadiene/polystyrene block copolymer having a styrene content ranging from 20 to 50% by weight and a $M_n$ ranging from 50,000 to 150,000.

To the resin blend of the instant invention for use in producing thermoformed products may properly be added additives such as pigments when coloring is desirable, process oil, resins, lubricants, antiblocking agents and the like for processing aids, as well as antioxidants, U.V. stabilizers and the like for improved aging characteristics.

The working method for the preparation of the resin compositions are not particularly restricted. For instance, ingredients for the resin blend composition may be thoroughly mixed in a mixing machine such as a single screw or twin screw extruder or the like.

The following examples are given as illustrations of the instant invention and are not intended as limitations thereof.

Preparation of $S_1$-$(B/S_2)_n$ Type Block

Copolymers Utilizing B'-S' Type Dispersants

In the following examples live end polymer chains were terminated utilizing isopropanol or other known terminating agent, the antioxidant which was utilized was a combination of trinonylphenylphosphite and ditertiarybutyl-para-cresol or other antioxidants which are commonly known. 1,3-Butadiene and styrene are utilized as solutions in dried, commercial hexane solvents and concentrations of any desired level are usable. In these examples, concentrations of 20% to 35% were used. In Examples A through H, the recovered $S_1$-$(B/S_2)_n$ block copolymers are blended with the B'-S' type copolymers. $M_n$ weights which are displayed in the following examples are approximate.

EXAMPLE A

Into a one-half gallon sealed stainless steel reactor equipped with inlet and outlet means, an agitator and means for reading and controlling the temperature, there is added under a nitrogen atmosphere 88 gm. styrene, 5.0 gm of a butadiene/styrene (Bd/Sty) diblock dispersant having a 31% styrene content and $M_n$=16,700, 2.8 mmoles of n-butyllithium in 580 gm of commercial grade hexane solvent. The reactants are heated and stirred for two hours at 65° C. and subsequently cooled to ambient temperature. To these reactor contents were added 100 gm. styrene and 62 gm. 1,3-butadiene in 400 gm hexane solvent and the resultant mixture was heated for two hours at 80° C. until polymerization was substantially complete at which time the polymer live ends were terminated. The temperature was lowered and 0.5 parts phgm of an antioxidant (ditertiarybutyl-para-cresol) was added to the low viscosity suspension. The polymer suspension was dried to give a 100% yield with molecular weight $M_n$=82,000 Mw of 133,000 and a structure of S-(B/S) having approximately a 35%-(25%/40%) block component ratio by weight. Molecular weights are approximate as appropriate Mark-Houwink constants for use with these block copolymers have not been obtained.

EXAMPLE B

The procedure of Example A was repeated utilizing an initial charge of 46 gm styrene, 1.7 gm of the Bd/Sty diblock dispersant as used in Example 1, 3.9 mmole n-butyllithium in 140 gm of hexane solvent. The reactants were heated and stirred for 1 hour at 65° C. and cooled to ambient temperature after which 252 gm of styrene and 55 gm of 1,3-butadiene in 680 gm of hexane was added. The reactor contents were heated to 80° C. for two hours. The polymer suspension live ends were terminated and 0.5 parts phgm of an antioxidant was added. The polymer suspension was dried to give a 100% yield of a polymer having a $M_w$ of 99,000, I.R. indicated 82.5% styrene content and a structure of Styrene-(Butadiene/Styrene), S-(B/S), having approximately 13%-(16%/71%) block component ratio by weight.

EXAMPLE C

In accordance with the procedure of Example A, a reaction was charged with 37 gm styrene, 1.5 gm of a butadiene-styrene (BSBS) tetrablock dispersant composed of 40% styrene and approximately $M_n$=100,000, and 3.9 mmole n-butyllithium in 185 gm of hexane solvent. The contents of the reactor were stirred and heated for one hour at 65° C. and then cooled to ambient temperature. The reaction mixture was then additionally charged with 52 gm of styrene and 44 gm of 1,3-butadiene in 240 gm of hexane and then heated and stirred for one hour at 75° C. The reaction mix was cooled and an additional charge of 173 gm of styrene and 44 gm of 1,3-butadiene in 495 gm of hexane was added and subsequently heated and mixed for 1¼ hr. at 80°-90° C. to effect polymerization. The polymer suspension was cooled and dried to provide a block polymer having a $M_w$=88,000, an I.R. indicated styrene content of 77% on a structure of S-(B/S)$_2$ having an approximate weight distribution of 11%-12%/15%-12%/51%.

EXAMPLE D

The procedure of Example A was followed in a two gallon stirred stainless steel reactor. The reactor was charged with 172 gm of styrene, 13.6 gm of BSBS tetrablock dispersant as in Example C and 16 mmoles of n-butyllithium.

The reaction mix was stirred and heated at 55-60° C. for 1½ hours and then cooled. The reactor was then additionally charge with 687 gm of styrene and 390 gm of 1,3-butadiene in 2400 gm of hexane. The mix was then polymerized at 70-95° C. for 3 hours. The polymer suspension live ends were terminated and 0.5 parts phgm of an antioxidant were added. The polymer was recovered from the suspension by drying to display 100% conversion, a $M_w=95,000$, a styrene content of 72.5% and block styrene=64.8% by $^1H_{NMR}$ and a structure of S-(B/S) having approximate weight ratios of 15%-28%/57%.

EXAMPLE E

The procedure of Example D was followed utilizing an initial charge of 60.8 gm of a BS diblock dispersant having 53% styrene content and $M_n=81,000$, 107 gm of styrene and 17 mmoles of n-butyllithium in 620 gm of hexane which was then polymerized for one hour at 60° C. The polymer suspension was cooled and an additional charge of 905 gm of styrene and 337 gm of 1,3-butadiene in 2950 gm of hexane plus 0.29 mmole of bistetrahydrofuryl propane (a n-BuLi modifier) was added to the reactor. The reactor contents were polymerized for 2.5 hours at 70-100° C. The polymer suspension was live end terminated and 0.5 parts phgm of an antioxidant was added. The polymer of structure S-(B/S) was recovered by drying displaying 100% conversion of monomer to polymer, a total styrene content of 75.7% by $^1H_{NMR}$ and a $M_w=107,000$.

EXAMPLE F

A 100 gallon stirred stainless steel reactor was charged in accordance with the procedure of Example A with 41.8 lbs. of hexane, 17.3 lbs. of 30% styrene/70% butadiene diblock ($M_n=100,000$) dispersant in hexane (20%), 31.4 lbs. of 33% styrene/hexane solution and 0.083 phm n-BuLi catalyst (43.3g). The mix was stirred and polymerized for one hour at 160° F. The polymer suspension was cooled to 100° F. and an additional charge of 240.5 lbs. of 33% styrene/hexane solution and 76.7 lbs. of 33% butadiene/hexane was added. Polymerization was conducted at 170° F. for two hours. Polymer suspension live ends were terminated and 0.66 phm of an antioxidant was added.

The final polymer dispersion was thin and milk-like and the polymer was recovered by drying and pelletizing operations to display a structure of S-(B/S) in a weight ratio of 9%-22%/69% having a $M_n=158,228$ and a melt index of 16.0.

EXAMPLE G

A 100 gallon reaction was charged in accordance with the procedure in Example F with 33.8 lbs. of hexane, 25.4 lbs. of 30% styrene/70% butadiene dispersant, $M_n=100,000$ (13.6% in hexane), 31.4 lbs. of 33% styrene/hexane and 42.1 g (0.080phm) n-BuLi catalyst (added in 3 lbs. hexane diluent). The mix was polymerized for one hour at 160° F. The batch was cooled to 100° F. and additionally charged with 240.5 lbs. of 33% styrene/hexane, 76.7 lbs. of 33% butadiene/hexane and 2.1 gm of tetramethylethylene diamine. The batch was then polymerized for 2 hours at 170° F. The batch was live end terminated while hot and 66 phm of an antioxidant was added. The dispersion had a low viscosity and was milk-like. The dispersion was dried to produce a block polymer of the structure S-(B/S) having the component weight ratio of 9%-22%/69%, a $M_n=91,075$, a $M_w=131,450$ and a melt index of 16.5.

EXAMPLE H

In accordance with the procedure of Example G a 100 gallon stirred reactor was charged with 30.8 lbs. of hexane, 35% styrene/65% butadiene dispersant, $M_n=100,000$ (18% in hexane), 27.9 lbs. of 33% styrene/hexane, and 2.7 lbs. hexane solution of n-BuLi catalyst (0.70 phm). The charge was polymerized for one hour at 160° F. then cooled to 100° F. An additional charge of 231.7 lbs. of 33% styrene/hexane, 88.9 lbs. of 33% butadiene/hexane and 2.3 gm of bistetrahydrofuryl propane (40ppm) was added to the batch which was then polymerized for 2 hours at 170° F. The live ends of the hot batch polymer were then terminated and 1.12 phm of an antioxidant was added. The polymer was recovered from suspension by drying to display a block polymer structure of S-(B/S) having a component weight ratio of 8%-25.5%/66.5%, a $M_n=136,918$ and a melt index of 11.7.

EXAMPLES 1-15

In each of the following examples a blend of resins was produced by mixing (A) 1500 grams of pelletized block copolymer which contained both (1) $S_1$-$(B/S_2)$ block copolymer wherein the $S_1$ and $S_2$ block were formed from styrene and the B block was formed from 1,3 butadiene and (2) a butadiene/styrene block copolymer and (B) 1500 grams of pelletized polystyrene commercially available as Amoco R3 crystal polystyrene having a melt index of 6.0. The blend was run through a Wayne extruder which was fitted with an eight inch sheet die at an extrusion temperature of 350° to 450° F. The molten sheet was run over a chill roller and controlled to 0.018 in. gauge.

The results of tests performed on the sheets which were produced are displayed in Table 1. The $S_1$-$(B/S_2)$ block copolymer data for each resin blend is displayed as a percentage of each component. For instance Example 1 displays a component percentage of 15-28/57 which identifies a weight percentage of $S_1$ as 15%, B as 28% and $S_2$ as 57%. $S_1$ and $S_2$ were formed from styrene and B was formed from 1,3-butadiene.

The diene/vinylaromatic block copolymer resin components are identified according to structure whereas BSBS was a polybutadiene-polystyrene-polybutadiene-polystyrene block polymer and BS was a polybutadiene-polystyrene block polymer.

The various sheets produced were measured for the following characteristics. Total transmission haze and reflectance blue were measured on a Hunterlab D25-PC2 colorimeter according to ASTM D 1003. Impact strength was measured with a Gardner impact tester. MIT Flex was measured using a Tinius Olsen Folding Endurance Tester according to ASTM D 2176. Melt Index was measured using a Tinius Olsen Extrusion Plastometer, Condition G. Example 11 utilized a total of 1200 grams of a mixture of $S_1$-$(B/S_2)$ block copolymer which contained a polystyrene/polybutadiene additive in an amount of 4.0 pphg of $S_1$-$(B/S_2)_n$ and 1800 grams of polystyrene.

TABLE 1

| Example No. | 1 | 2 | 3 | 4 | 5 | 6 | 7 | 8 |
|---|---|---|---|---|---|---|---|---|
| $S_1$-$(B/S_2)_n$ | 15-28/57 | 10-25/65 | 10-30/60 | 10-28/62 | 10-25/65 | 9-23/68 | 9-23/68 | 9-23/67 |
| Melt Index | — | 5.5 | — | — | 7.3 | 10.7 | 6.0 | 8.7 |

$^1H_{nmr}$

TABLE 1-continued

| % styrene | 69.5 | 75.7 | 70.8 | 73.6 | 73.0 | 75.8 | 73.7 | 75.2 |
|---|---|---|---|---|---|---|---|---|
| % block styrene | 59.6 | 64.9 | 60.9 | 63.5 | 62.3 | 64.4 | 63.6 | 54.8 |
| Block copolymer additive structure | BSBS | BS | BS | BSBS | BS | BS | BS | BS |
| % styrene | 40 | 32 | 32 | 40 | 30 | 30 | 30 | 30 |
| pphg. $S_1$-$(B/S_2)_n$ | 0.8 | 0.7 | 0.5 | 0.5 | 1.5 | 1.0 | 5.0 | 3.0 |
| Haze | 4.1 | 3.4 | 4.7 | 3.8 | 3.0 | 3.4 | 5.0 | 4.5 |
| Blue (neg) | 6.6 | 4.0 | 8.7 | 5.6 | 5.4 | 3.4 | 3.6 | 4.7 |
| Gardner impact | 2.1 | 2.5 | 1.9 | 1.7 | 1.4 | 1.2 | 1.6 | 1.2 |
| MIT Flex 45° | — | — | — | — | — | — | — | — |
| Blend composition % of block copolymer (low styrene) | 0.4 | 0.35 | 0.25 | 0.25 | 0.75 | 0.5 | 2.5 | 1.5 |

| Example No. | 9 | 10 | 11 | 12 | 13 | 14 | 15 |
|---|---|---|---|---|---|---|---|
| $S_1$-$(B/S_2)_n$ | 8-25/67 | 8-25/67 | 10-30/60 | 9-23/68 | 9-23/68 | 9-24/67 | 8-24/68 |
| Melt Index | — | — | 6.7 | 15.6 | 21.4 | 10.9 | — |
| $^1Hnmr$ | | | | | | | |
| % styrene | 75.1 | 76.1 | 70.9 | 74.9 | 76.7 | 72.2 | 73.9 |
| % block styrene | 57.2 | 55.4 | 42.5 | 61.9 | 56.4 | 56.9 | 62.1 |
| Block copolymer additive structure | BS | BS | BS | BS | BS | BS | BS |
| % styrene | 35 | 35 | 40 | 30 | 30 | 30 | 35 |
| pphg. $S_1$-$(B/S_2)_n$ | 4.5 | 4.5 | 4.0 | 3.0 | 3.0 | 3.0 | 7.0 |
| Haze | 5.2 | 6.1 | 8.5 | 5.4 | 4.1 | 4.1 | 2.6 |
| Blue (neg) | 5.7 | 4.9 | 11.1 | 3.2 | 3.5 | 5.4 | 3.8 |
| Gardner impact | 3.3 | 5.6 | 2.4 | 1.5 | 1.9 | 2.2 | 1.4 |
| MIT Flex 45° | 312 | 562 | 1221 | — | — | — | 235 |
| Blend composition % of block copolymer (low styrene) | 2.25 | 2.25 | 1.6 | 1.5 | 1.5 | 1.5 | 3.5 |

What is claimed is:

1. A thermoformable resin blend for use in the production of thermoformed products having high clarity consisting essentially of the following components:
   (A) 20 to 75% by weight of at least one homopolymer of a polyvinylaromatic resin prepared from monomers selected from the group consisting of styrene, alpha-methylstyrene, methyl substituted styrene and methyl substituted alpha-methylstyrene,
   (B) 20 to 75% by weight of a $S_1$-$(B/S_2)_n$ block copolymer prepared in a batch process wherein $S_1$ and $S_2$ represent vinylaromatic resin blocks contributing a total of 65 to 95% by weight to the block copolymer, B represents a diene block, (B/$S_2$) represents a block copolymer, and $n \geq 1$, and
   (C) 0.5 to 2.25 by weight of a diene/vinylaromatic block copolymer containing 10% to 60% by weight of vinylaromatic monomer contributed units.

2. The blend of claim 1 wherein the polyvinyl aromatic resin of component (A) is polystyrene.

3. The blend of claim 1 wherein the $S_1$ block contributes 5 to 20% by weight of $S_1$-$(B/S_2)_n$ block copolymer.

4. The blend of claim 1 wherein $S_1$ and $S_2$ represent styrene blocks and B represents butadiene block.

5. The blend of claim 1 wherein component (c) is a 1,3-butadiene/styrene diblock copolymer.

6. The blend of claim 1 wherein component (c) is a butadiene/styrene/butadiene/styrene tetrablock.

7. The blend of claim 1 wherein component (a) is used in an amount ranging from 35 to 65% by weight.

8. The blend of claim 1 wherein component (b) is used in an amount ranging from 30 to 60% by weight.

9. The blend of claim 1 wherein component (c) is used in an amount ranging from 1.0 to 5% by weight.

10. The blend of claim 1 wherein component (c) has a molecular weight ($M_w$) ranging between 20,000 and 250,000.

11. The blend of claim 1 consisting of
    (a) 20 to 75% by weight of polystyrene.
    (b) 20 to 75% by weight of a polystyrene(-polybutadiene/polystyrene)$_n$ tapered block copolymer, and
    (c) 0.5 to 10% by weight of a 1,3butadiene/styrene block copolymer.

12. The blend of claim 1 wherein $S_1$ and $S_2$ are independently selected from the group consisting of alphamethylstyrene, methyl substituted styrene, methyl substituted alpha-methylstyrene, styrene and mixtures thereof.

13. The blend of claim 1 wherein the diene block B is formed from monomers selected from the group consisting of 1,3-butadiene, isoprene, 1,3-pentadiene or mixtures thereof.

14. The blend of claim 1 wherein (B/$S_2$) represents a tapered block copolymer.

15. The blend of claim 1 wherein (B/$S_2$) represents a non-tapered block copolymer.

* * * * *